United States Patent
Fuchikami

(10) Patent No.: US 10,161,745 B2
(45) Date of Patent: Dec. 25, 2018

(54) REAL-TIME-MEASUREMENT PROJECTION DEVICE AND THREE-DIMENSIONAL-PROJECTION MEASUREMENT DEVICE

(71) Applicant: PANASONIC INTELLECTUAL PROPERTY MANAGEMENT CO., LTD., Osaka (JP)

(72) Inventor: Ryuji Fuchikami, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/737,418

(22) PCT Filed: May 11, 2016

(86) PCT No.: PCT/JP2016/002302
§ 371 (c)(1),
(2) Date: Dec. 18, 2017

(87) PCT Pub. No.: WO2017/002293
PCT Pub. Date: Jan. 5, 2017

(65) Prior Publication Data
US 2018/0188020 A1  Jul. 5, 2018

(30) Foreign Application Priority Data

Jun. 30, 2015 (JP) ................................. 2015-131302

(51) Int. Cl.
*G01J 3/46* (2006.01)
*G01B 11/25* (2006.01)
(Continued)

(52) U.S. Cl.
CPC ............ *G01B 11/254* (2013.01); *G01B 11/25* (2013.01); *G06T 1/00* (2013.01); *G09G 3/346* (2013.01);
(Continued)

(58) Field of Classification Search
CPC ......... G01B 11/25; G01B 11/254; G06T 1/00; G09G 5/00; G09G 5/02; G09G 5/36; G09G 5/37; G09G 5/42
See application file for complete search history.

(56) References Cited

U.S. PATENT DOCUMENTS 9,832,436 B1    11/2017  Fuchikami et al.
2004/0125205 A1*  7/2004  Geng ................. G01B 11/2509
                                                                 348/142
(Continued)

FOREIGN PATENT DOCUMENTS

JP          4917351        4/2012
JP      2013-127434        6/2013
(Continued)

OTHER PUBLICATIONS

International Search Report (ISR) from International Searching Authority (Japan Patent Office) in International Pat. Appl. No. PCT/JP2016/002302, dated Aug. 16, 2016.
(Continued)

*Primary Examiner* — Abdullahi Nur
(74) *Attorney, Agent, or Firm* — Greenblum & Bernstein, P.L.C.

(57) ABSTRACT

Provided is a real-time-measurement projection device which can measure a distance to a changing target object in real time, and, particularly, can appropriately perform projection and mapping on a changing target object. A real-time-measurement projection device includes a projection device that projects pattern light including a pattern image
(Continued)

onto a projection target, an imaging device that electronically acquires a captured image of the projection target irradiated with the pattern light for each pixel for a predetermined exposure time, and a calculation device that calculates a distance to each point of the projection target by contrasting data of the captured image with data of the pattern image, in which the imaging device temporally deviates a start point and an end point of the predetermined exposure time for each pixel.

16 Claims, 8 Drawing Sheets

(51) Int. Cl.
| | |
|---|---|
| *G06T 1/00* | (2006.01) |
| *G09G 5/00* | (2006.01) |
| *G09G 5/02* | (2006.01) |
| *G09G 5/36* | (2006.01) |
| *H04N 9/31* | (2006.01) |
| *G09G 5/37* | (2006.01) |
| *G09G 5/42* | (2006.01) |
| *H04N 17/00* | (2006.01) |
| *G09G 3/34* | (2006.01) |
| *H04N 5/228* | (2006.01) |

(52) U.S. Cl.
CPC ............... *G09G 5/00* (2013.01); *G09G 5/02* (2013.01); *G09G 5/36* (2013.01); *G09G 5/37* (2013.01); *G09G 5/42* (2013.01); *H04N 9/3164* (2013.01); *H04N 9/3185* (2013.01); *H04N 9/3194* (2013.01); *H04N 17/002* (2013.01); *G09G 2320/0252* (2013.01); *G09G 2320/0693* (2013.01); *G09G 2360/147* (2013.01); *G09G 2360/18* (2013.01); *H04N 5/2283* (2013.01)

(56) References Cited

U.S. PATENT DOCUMENTS

| | | |
|---|---|---|
| 2008/0180640 A1 | 7/2008 | Ito |
| 2012/0162140 A1 | 6/2012 | Lee et al. |
| 2014/0354803 A1 | 12/2014 | Chida |
| 2016/0191159 A1 | 6/2016 | Aoyama et al. |

FOREIGN PATENT DOCUMENTS

| | | |
|---|---|---|
| JP | 2013-192189 | 9/2013 |
| WO | 2015/075937 A1 | 5/2015 |

OTHER PUBLICATIONS

The Extended European Search Report from the European Patent Office (EPO) dated Jun. 5, 2018 for the related European Patent Application No. 16817407.6.

Chen Jun et al: "Simultaneous projection mapping using high-frame-rate depth vision", 2014 IEEE International Conference on Robotics and Automation (ICRA), IEEE, May 31, 2014 (May 31, 2014), pp. 4506-4511, XP032650620.

Kwang Hee Lee et al: "Color-Stripe Structured Light Robust to Surface Color and Discontinuity", Nov. 18, 2007 (Nov. 18, 2007), Computer Vision—ACCV 2007; [Lecture Notes in Computer Science], Springer Berlin Heidelberg, Berlin, Heidelberg, pp. 507-516, XP019082497.

* cited by examiner

CALCULATION DEVICE

REAL-TIME-MEASUREMENT PROJECTION DEVICE AND THREE-DIMENSIONAL-PROJECTION MEASUREMENT DEVICE

TECHNICAL FIELD

The present disclosure relates to a real-time-measurement projection device which irradiates a changing target object with pattern light of invisible light from a projection device, so as to convert a measurement result in an imaging device into a projection coordinate of the corresponding projection device in real time, and projects the result obtained through measurement as a visible light video in the projection device, and particularly to a real-time-measurement projection device for projection and mapping. The present disclosure further relates to a three-dimensional-projection measurement device which irradiates a changing target object with pattern light of invisible light from a projection device, so as to easily and rapidly measure a distance to each point of a projection target.

BACKGROUND ART

There is a technique called projection and mapping as a technique of projecting a desired content image onto a target object such as a building. Generally, since a target object has a three-dimensional shape, in a case where a content image is projected without being changed, the projected image appears to be distorted to a spectator at a position separate from a projection device due to unevenness of a surface of the target object or a difference between depths thereof. Thus, a correspondence between respective pixels of an imaging device and a projection device for each point of a target object is measured in advance, and a content image undergoes corresponding coordinate conversion so as to be projected, and thus a content image without distortion can be viewed.

In the related art, since a target object is a fixed object such as a building, typically, a correspondence between respective pixels of an imaging device and a projection device for each point of the target object is measured in advance, and projection and mapping are performed on the basis of correspondence information of the respective pixels of the fixed imaging device and projection device. However, there is the need to perform projection and mapping on a vehicle, a dancer, an athlete, or the like, and a device for preferably performing projection and mapping on a changing target object is desirable.

PTL 1 discloses a technique of mapping texture onto a surface of a target object of which a shape changes or which is moving, but does not take into consideration distortion of a projection image due to the three-dimensional target object. PTL 2 discloses a three-dimensional distance measurement device. PTL 3 discloses a measurement method using a rolling shutter type camera and a liquid crystal display type projector.

Here, when a device for performing projection and mapping on a moving object is considered, a delay time from the time of measurement to the time of video projection is considerably problematic. In a video projection device of 60 fps of the related art, since a time of 1/60 seconds or more is required in each imaging, transmission, computation, and display, a projection error of several tens of cm or more occurs even in slow movement of about 1 m per second, and thus projection onto a vehicle, a dancer, an athlete, and the like cannot be performed.

Here, in recent years, a display device called a digital mirror device (DMD) with a very high speed of over 1000 fps has been mounted on a projector available in the market. Therefore, if high-speed measurement can be performed at the same time with projection of a video according to any method without a viewer's awareness, such as using of such a high-speed device and a high-speed camera and also combining with invisible light, it is possible to perform projection and mapping on a moving object in real time.

CITATION LIST

Patent Literature

PTL 1: Japanese Patent Unexamined Publication No. 2013-192189
PTL 2: Japanese Patent No. 4917351
PTL 3: Japanese Patent Unexamined Publication No. 2013-127434

SUMMARY OF THE INVENTION

However, since the digital mirror device (DMD) is configured to change colors through switching between light sources, switching between visible light and invisible light is required to be globally in the frame unit, and thus there is a problem in that only a global shutter type camera is used as the high-speed camera. A CCD image sensor type camera is generally used as the global shutter type camera, but, it is hard to manufacture a camera with a high speed such as 1000 fps in principle.

On the other hand, a so-called CMOS image sensor with a speed of over 1000 fps is generally manufactured and is commercially available, but is of a type in which each pixel called a rolling shutter is exposed to light in a time delay manner. There is a global shutter type CMOS image sensor, but a charge storage for absorbing a difference between an exposure timing and a reading timing is required to be provided in each pixel. Therefore, the sensor is expensive, and there is a problem in that the sensor has low sensitivity since an exposure area of each pixel is reduced due to the charge storage.

PTL 3 discloses a technique of alleviating a problem by synchronizing a difference between respective lines of liquid crystal display with a difference between exposure timings of a rolling shutter type in a liquid crystal display device, but only discloses efficiency in terms of heat countermeasures, and thus does not disclose a problem that a light source is required to be globally changed in a DMD type projector, or the content that a measurement result is also required to be projected as a visible light video as in projection and mapping.

In light of the problems of the related art and findings of the present inventors, a principal object of the present disclosure is to provide a device in which projection of pattern light and projection of video light can be made compatible without contradiction at a high speed by combining a DMD type projector in which switching between global light sources is only performed with a cheap rolling shutter type camera.

According to the present disclosure, the object is achieved by providing a real-time-measurement projection device including an imaging device of a rolling shutter type, that is, an imaging type of temporally deviating a start point and an end point of the predetermined exposure time for each pixel; a projection device which can project visible light and invisible light; and a calculation device, in which pattern light including a pattern image onto a projection target is projected from the projection device in a temporally deviated manner for each pixel under the control of the calculation device, an image of the projection target irradiated with the pattern light is captured by the imaging device, correlation between individual pixels of the imaging device and the projection device is performed by contrasting the image captured by the imaging device with data of the pattern image, and a video is projected with visible light from the projection device on the basis of a result of the correlation.

According to the present disclosure, it is possible to obtain a distance to an imaging target and a projection target according to trigonometry on the basis of a result of correlation in the real-time-measurement projection device and a positional relationship between the imaging device and the projection device. This is because, if a pixel position of the imaging device can be understood, a direction in which a target is imaged from the imaging device can be understood, and if a projection coordinate of the projection device can be understood, a direction of a target object from the projection coordinate can be understood, and mutual coordinates are correlated with each other.

In this case, the present device may also be used as a three-dimensional measurement device, and, in this case, the imaging device is not required to output a plurality of light beams such as visible light and invisible light, and it is possible to give a high added value by mounting only a single measurement function unit.

According to the present disclosure, the content measured by each pixel of the imaging device can be projected onto a changing target object in real time in correlation with each corresponding pixel of the imaging device by using a cheap device, and, thus, particularly, it is possible to appropriately perform projection and mapping on a changing target object.

DESCRIPTION OF EMBODIMENTS

Figure 1:
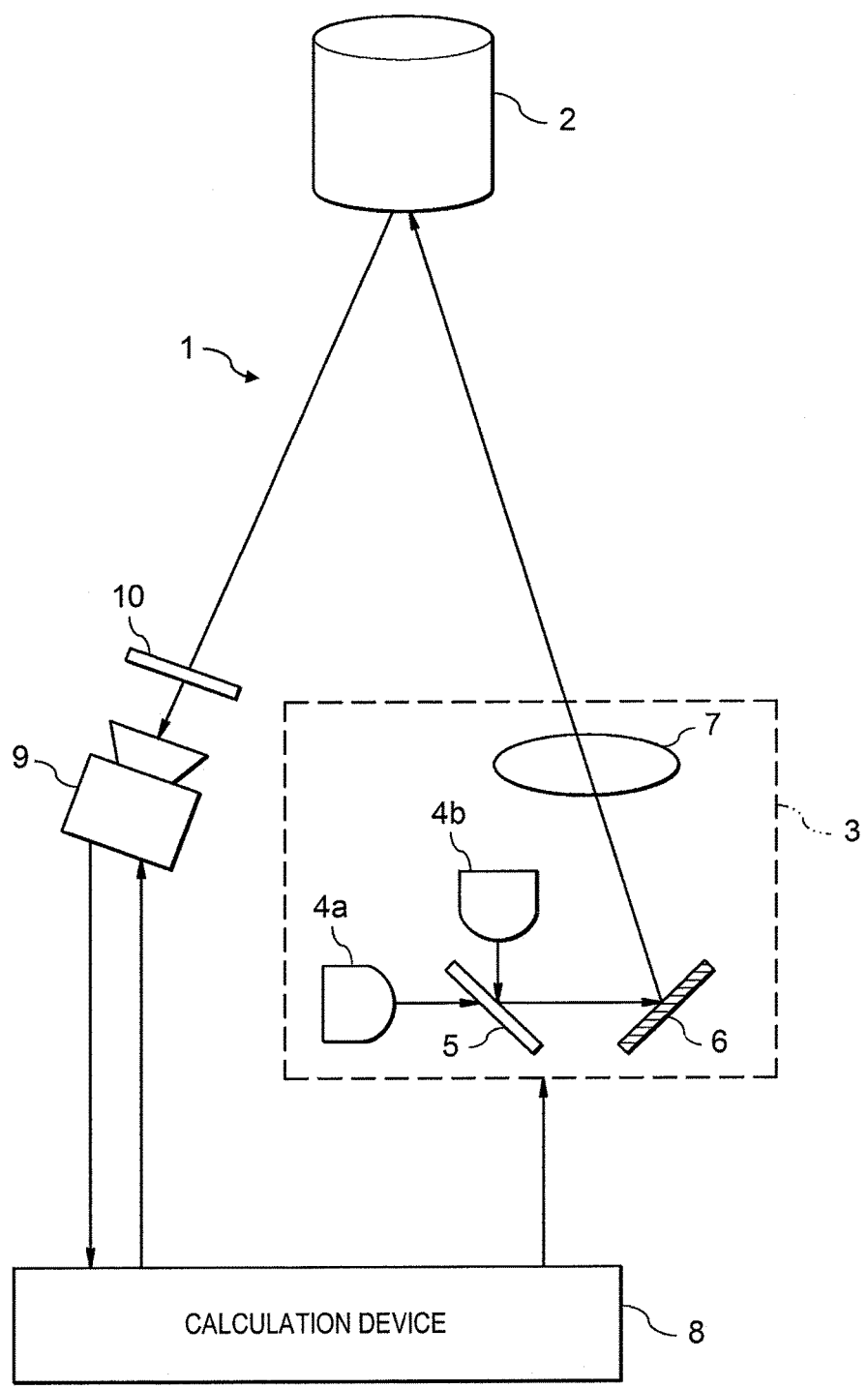
FIG. 1 is a diagram illustrating one embodiment of a real-time-measurement projection device according to the present disclosure.

In order to solve the above-described problem, according to a first disclosure, there is provided a real-time-measurement projection device including a projection device that projects pattern light including a pattern image onto a projection target; an imaging device that electronically acquires a captured image of the projection target irradiated with the pattern light for each pixel for a predetermined exposure time; and a calculation device that computes pixel correspondence information between each pixel of the imaging device and each pixel of the projection device by contrasting data of the captured image with data of the pattern image, converts measurement information of each pixel obtained from the imaging device into a correspondence coordinate of the projection device on the basis of the pixel correspondence information, and generates a video to be projected onto the projection target on the basis of the measurement information of each pixel converted into the correspondence coordinate of the projection device, in which the projection device is configured to irradiate the projection target with the video generated by the calculation device as video light in synchronization with a cycle of an exposure time in the imaging device, and in which the imaging device temporally deviates a start point and an end point of the predetermined exposure time for each pixel.

As mentioned above, according to the first disclosure, since a start point and an end point of a predetermined exposure time are temporally deviated for each pixel, data reading in each pixel is sequentially performed instead of being performed in parallel, and thus it is possible to use a cheap device as hardware, and also to reduce a load on the calculation device in reading an image signal of each pixel.

In one aspect of the present disclosure, the cycle of the exposure time is set in the frame unit of an image in the imaging device.

According to this aspect, since projection of an image, measurement of correspondence of individual pixels of the imaging device and the projection device, calculation of an image correction amount, and execution of image correction are performed in the frame unit, it is possible to smoothly perform a series of operations while minimizing a load on the calculation device or the like.

In another aspect of the present disclosure, the video light is visible light, and the pattern light is invisible light.

The invisible light is, for example, near infrared light or ultraviolet light.

According to this aspect, a viewer can view video light without interference with pattern light.

In still another aspect of the present disclosure, each of the pattern light projection device and the video light projection device includes a visible light source; an invisible light source; a dichroic mirror that aligns light beams from both of the light sources on a common optical axis; a digital micro-mirror element that spatially modulates light from the mirror; and a projection lens that focuses light emitted from the digital micro-mirror element on the projection target.

According to the aspect, a large number of portions of the pattern light projection device and the video light projection device can be used in common, and thus it is possible to simplify a facility. In still another aspect of the present disclosure, the imaging device includes a visible light cutoff filter through which the invisible light is transmitted and which blocks the visible light.

According to the aspect, pattern light can be imaged without interference with video light, and thus it is possible to accurately measure a correspondence between individual pixels of the imaging device and the projection device.

In still another aspect of the present disclosure, the pattern light is temporally shifted to be projected for each of a plurality of subframe regions set in each frame.

According to the aspect, such a high-speed process is not necessary in order to project pattern light, and a load on the pattern light projection device or the calculation device can be reduced.

A measurement result of each pixel in the imaging device is luminance or a color, but a distance may be determined according to trigonometry by using a positional relationship between the imaging device and the measurement device, and a result may be used as a measurement result. Also in this case, a measurement distance for each pixel is correlated with each pixel of the projection device.

According to the aspect, a distance to each point of the projection target object corresponding to each pixel of the corresponding imaging device can be measured through projection in real time, and, thus, particularly, it is possible to appropriately perform projection and mapping on a changing target object.

In still another aspect of the present disclosure, the pattern light is set on the basis of a space coding method.

According to the aspect, it is possible to perform high-speed and accurate correlation with each pixel of the projection device by using a measurement result of each pixel in the imaging device.

In the still another aspect of the present disclosure, the measurement information used for generation of the video is a distance, and a texture image used for generation of a video is changed according to the distance. Alternatively, the measurement information used for generation of the video is a distance, a clipping mask of a projection target object is generated according to the distance, and a video in which a color of a contour of the mask is changed is generated. The measurement information used for generation of the video is a distance, and a color of a video is changed according to the distance. Alternatively, the measurement information used for generation of the video is a distance, and a color of a video is changed according to the distance. Alternatively, the measurement information is color information imaged by the imaging device, and, in this case, video correction may be performed by using a complementary color of a color included in the color information.

According to the aspect, it is possible to introduce various visual effects, and thus to realize more charming projection and mapping.

In still another aspect of the present disclosure, the pattern image includes a plurality of pairs of black and white inversion image patterns based on a Manchester coding method, and video content is updated every two frames.

According to the aspect, the same content image is projected during two frames during which images of each pair of complementary measurement patterns are projected, a difference between complementary measurement patterns is taken when code decoding is performed, and thus a content image is canceled out. Therefore, the content image does not interfere with pixel correspondence information, and thus a visible light filter is not required to be provided in front of the imaging device.

In still another aspect of the present disclosure, the pattern image includes a plurality of pairs of black and white inversion image patterns based on a Manchester coding method, the pattern image is divided into a plurality of subframe regions set in each frame, and the video content of a portion of the pattern image corresponding to each subframe region is updated every two frames.

According to the aspect, such a high-speed process is not necessary in order to project pattern light, and a load on the pattern light projection device or the calculation device can be reduced. A difference between complementary measurement patterns is taken when code decoding is performed, and thus a content image is canceled out. Therefore, the content image does not interfere with distance measurement, and thus a visible light filter is not required to be provided in front of the imaging device.

In order to solve the above-described problem, according to a second disclosure, there is provided a real-time-measurement projection device including a projection device that projects pattern light including a pattern image onto a projection target; an imaging device that electronically acquires a captured image of the projection target irradiated with the pattern light for each pixel for a predetermined exposure time; and a calculation device that calculates a distance to each point of the projection target by contrasting data of the captured image with data of the pattern image, in which the imaging device temporally deviates a start point and an end point of the predetermined exposure time for each pixel.

As mentioned above, according to the second disclosure, since a start point and an end point of a predetermined exposure time are temporally deviated for each pixel, data reading in each pixel is sequentially performed instead of being performed in parallel, and thus it is possible to use a cheap device as hardware, and also to reduce a load on the calculation device in reading an image signal of each pixel.

Hereinafter, embodiments of the present disclosure will be described with reference to the drawings.

Real-time-measurement projection device 1 according to the present disclosure is configured as a system performing projection and mapping. In real-time-measurement projection device 1, projection device 3 includes visible LED light source 4*a* and infrared LED light source 4*b*, combines light beams emitted therefrom with each other in dichroic mirror 5, and inputs a combined result to digital micro-mirror device (DMD) 6. Light emitted from DMD 6 is projected onto projection target 2 via lens optical system 7. Calculation device 8 selects and excites visible LED light source 4*a* and infrared LED light source 4*b*, and also supplies a control signal to DMD 6, so that light from a desired light source side can be modulated as necessary so as to be applied toward a predetermined point on projection target 2. As a result, a two-dimensional image of the pixel unit can be projected onto projection target 2, and a plurality of two-dimensional images can be projected in a time series as desired so as to be provided moving images.

Particularly, real-time-measurement projection device 1 acquires distance information of projection target 2 which is moving and/or being deformed, and enables an image projected by projection device 3 to be viewed without being distorted regardless of a change in projection target 2 on the basis of the obtained distance information. For this, projection device 3 projects a predetermined measurement pattern with invisible light (invisible electromagnetic wave) such as infrared light onto projection target 2, and camera 9 is provided to acquire the projected image. An image of the measurement pattern obtained by camera 9 is processed by calculation device 8, and thus distance information of projection target 2 is calculated. Projection device 3 corrects necessary video content, that is, performs coordinate conversion on the basis of the calculated distance information, and projects an image having undergone the coordinate conversion onto projection target 2 with visible light. Consequently, a viewer can view video content without being distorted regardless of a three-dimensional shape of projection target 2. In order to remove concern that visible light with which video content is projected may hinder acquisition of distance information, visible light filter 10 may be provided in front of camera 9.

Figure 2:
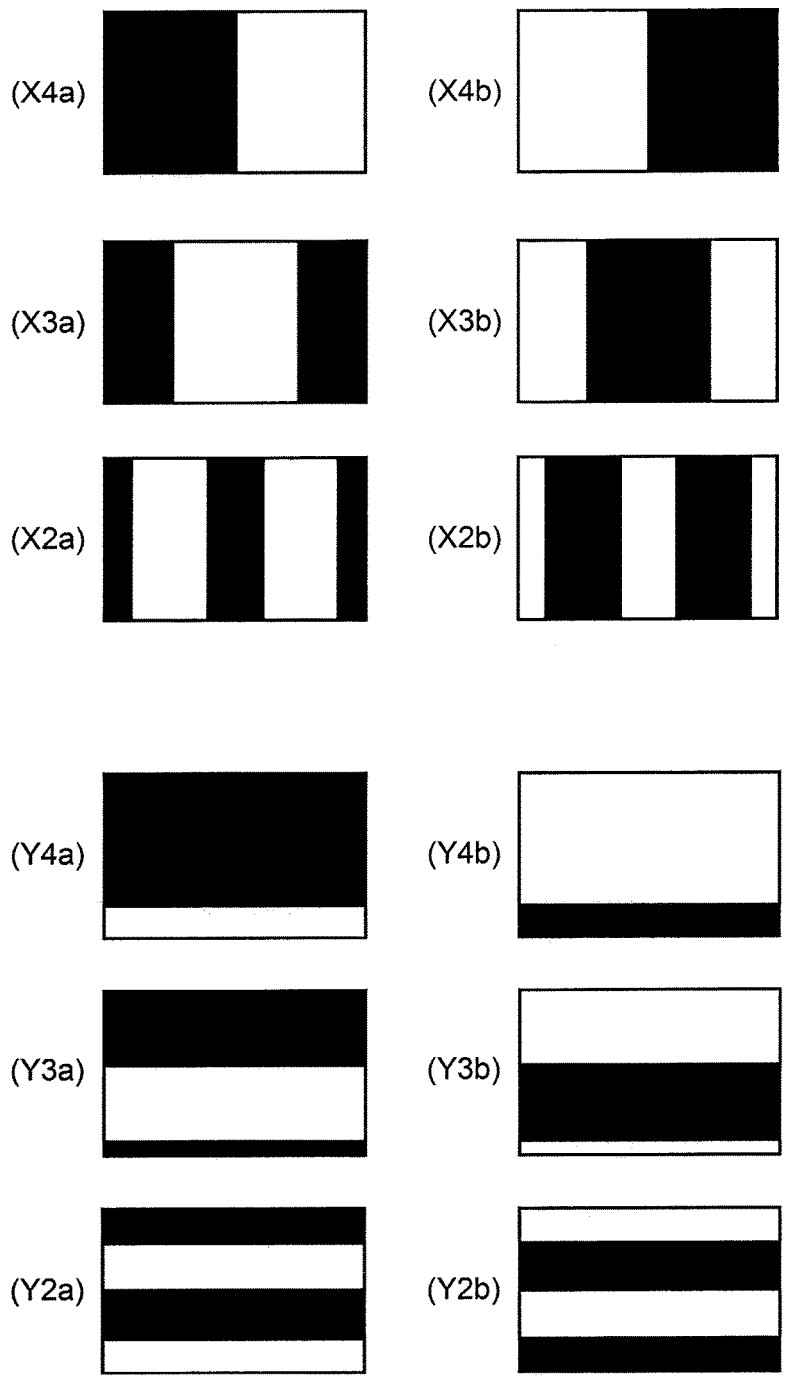
FIG. 2 illustrates examples of measurement patterns used in the real-time-measurement projection device according to the present disclosure.

FIG. 2 illustrates examples of measurement patterns corresponding to pixels, used in the real-time-measurement projection device. In the present example, the projection device is assumed to be formed of 1024×768 pixels, and each of an X coordinate and a Y coordinate may be expressed in 10 bits. When a coordinate value is expressed by a gray code, a pattern indicating a ninth bit which is the most significant bit of the X coordinate is X4a; an image obtained by inverting luminance as a complementary image pair is X4b; a pattern indicating an eighth bit of the X coordinate is X3a; an image obtained by inverting luminance as a complementary image pair is X3b; a pattern indicating a seventh bit of the X coordinate is X2a; an image obtained by inverting luminance as a complementary image pair is X2b; a pattern indicating a ninth bit which is the most significant bit of the Y coordinate is Y4a; an image obtained by inverting luminance as a complementary image pair is Y4b; a pattern indicating an eighth bit of the Y coordinate is Y3a; an image obtained by inverting luminance as a complementary image pair is Y3b; a pattern indicating a seventh bit of the Y coordinate is Y2a; and an image obtained by inverting luminance as a complementary image pair is Y2b, and a total of 40 image patterns including an image indicating a 0-th bit are subsequently set to the X coordinate and the Y coordinate.

Density information of each pixel is coded by using a gray code, and noise can be removed on the basis of a difference signal between a pair of complementary images (Manchester encoding method). Image pairs including twenty pairs of complementary images may be sequentially projected onto projection target 2 within a predetermined time, projected images may be processed, and coordinate information of the projection device may be correlated with each pixel of an imaging device.

The present example is an example of a case of 1024×768 pixels, the number of image patterns is forty, but the number of image patterns changes depending on a resolution or a desired accuracy. One of an Y coordinate and an X coordinate may be normally correlated with the imaging device and the projection device in a fixed manner, or may be set to be deviated only in a narrow range, depending on an installation condition of the imaging device and the projection device, and, in this case, coordinate codes of another coordinate can be reduced or considerably reduced.

Figure 3:
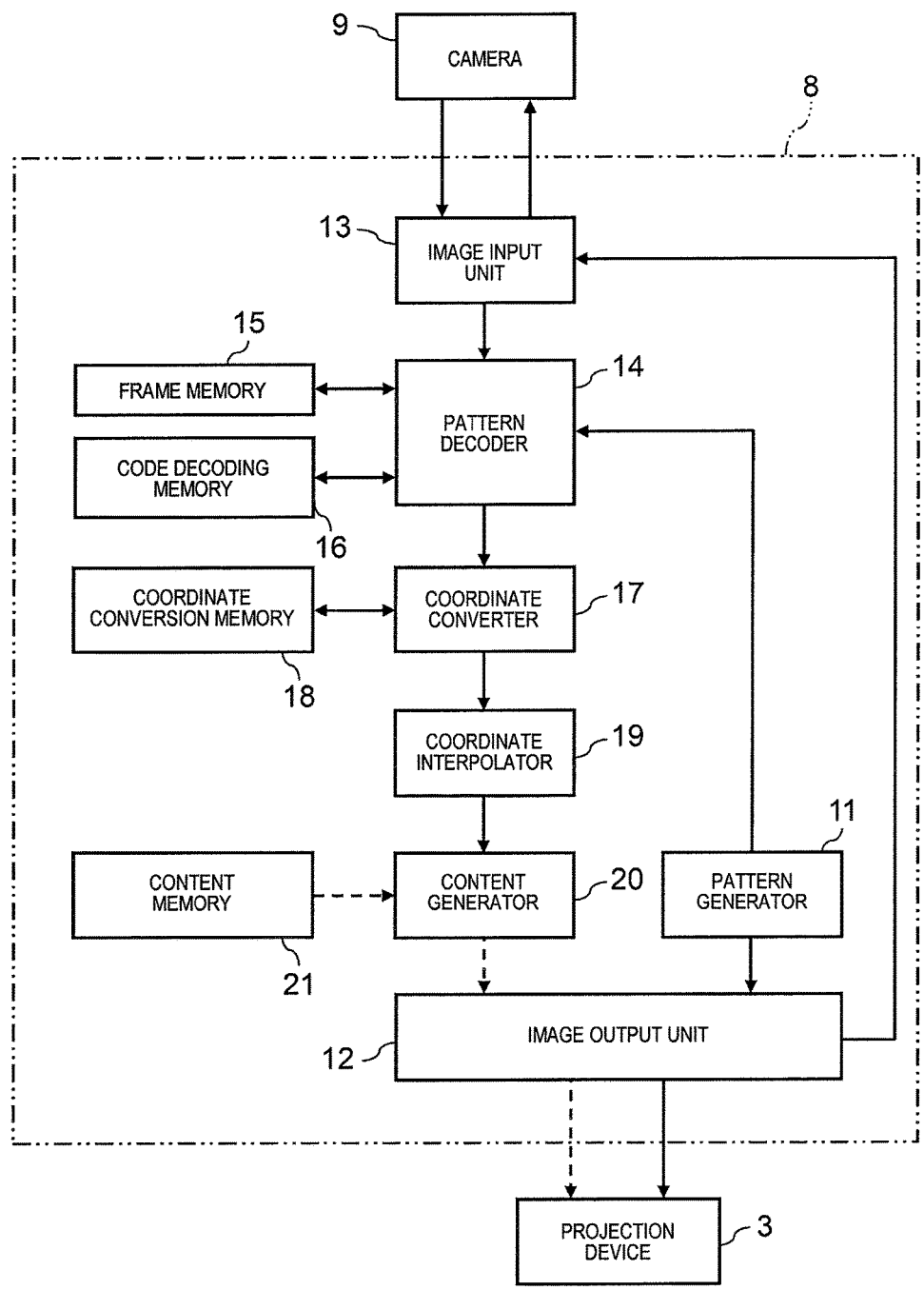
FIG. 3 is a block diagram illustrating details of a calculation device in the real-time-measurement projection device according to the present disclosure.

FIG. 3 illustrates details of calculation device 8 in the real-time-measurement projection device. A pattern generator 11 of calculation device 8 stores the above-described distance measurement patterns, and sequentially outputs the distance measurement patterns toward an image output unit 12 at predetermined timings, and the image output unit 12 supplies corresponding image signals to projection device 3. Image output unit 12 sends a timing of video output to image input unit 13, and image input unit 13 controls camera 9 to perform imaging synchronized with image output unit 12 in terms of timings.

An image of the measurement pattern projected onto projection target 2 is acquired by camera 9, and the obtained image is sent to image input unit 13. The obtained image is further sent to pattern decoder 14, one of a pair of complementary images is held in frame memory 15, a frame difference is computed, and a bit part corresponding to a code obtained from code decoding memory 16 is acquired from pattern generator 11 so as to be updated. The projection device and pixel correspondence information of the projection device are ultimately stored in code decoding memory 16, and the latest projection device and pixel correspondence information of the projection device are output to coordinate converter 17 whenever a single pair of complementary images is processed. In this case, any one of pieces of measurement information of each pixel, that is, luminance information, color information, and distance information is accompanied by the projection device and the pixel correspondence information of the projection device. Particularly, it is helpful to obtain luminance or a color to cancel out the code influence by adding a pair of complementary images here. Coordinate converter 17 rearranges measurement information of each pixel and also the rearranged measurement information to coordinate conversion memory 18 on the basis of the projection device and the pixel correspondence information of the projection device, then reads values in coordinate conversion memory 18 in the coordinate order of the projection device, and sends the values to coordinate interpolator 19.

Coordinate interpolator 19 interpolates the measurement information of each pixel received from coordinate converter 17 as necessary by using the information although measurement information of each pixel is not present in some cases. For example, this may be performed by using an interpolation method such as linear interpolation in a case where a pixel having effective measurement information is present within a predetermined range.

Content memory 21 stores texture, moving image data, meshes, a shader program, and the like which are materials of a video to be projected onto projection target 2, and the materials are read in response to a request from content generator 20. Content generator 20 generates a video to be mapped onto the projection target on the basis of the measurement information obtained from coordinate interpolator 19. A video image is sequentially output to image output unit 12, and image output unit 12 supplies an image signal corresponding to image output unit 12 to projection device 3.

Figure 4:
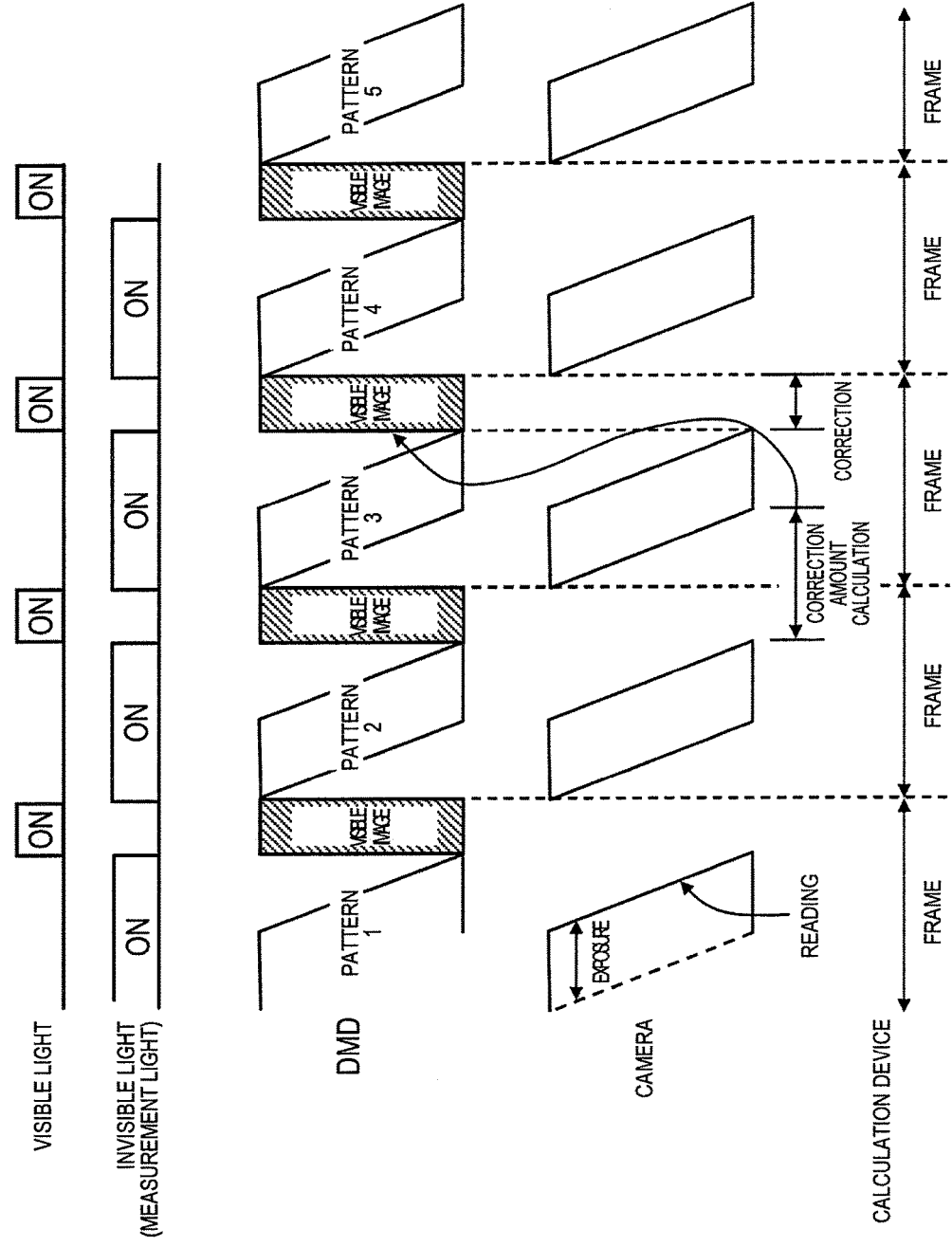
FIG. 4 is a time chart illustrating an operation timing of each unit in the real-time-measurement projection device according to the present disclosure.

FIG. 4 is a time chart illustrating time history of the above-described series of operations. In the present example, it is assumed that projection and imaging are performed in a cycle of 6000 frames per second. For example, it is assumed that infrared LED light source 4b is lighted for initial 90% of each frame, visible LED light source 4a is lighted for remaining 10% thereof, so that the light sources are alternately lighted. When infrared LED light source 4b is being lighted, DMD 6 sequentially projects the above-described forty measurement patterns onto projection target 2 for each frame under the control of calculation device 8, and camera 9 images the projected images. The imaged measurement patterns are processed by calculation device 8 so as to be converted into distance information. Since DMD 6 is an element which can perform an operation at a considerably high speed, the respective distance measurement patterns using invisible light may be projected simultaneously, but, in the present example, the patterns are projected by sequentially slightly delaying time such that raster scanning is performed with each frame.

On the other hand, camera 9 is configured by using a light receiving element formed of, for example, a CMOS in which photosensitive elements are arranged in a two-dimensional manner. All pixels of each frame of an image obtained from projection target 2 can be read simultaneously, but an expensive element is necessary. High-speed signal processing is necessary, and thus circuit design is also difficult. Therefore, in the present example, raster scanning is performed with an image obtained from projection target 2, the respective pixels disposed in a two-dimensional manner sequentially start to exposure, electric charge accumulated in each photosensitive element is extracted (read) after a predetermined exposure time elapses for each photosensitive element, and thus an electrical signal corresponding to a light reception amount is generated. In this case, an exposure start timing for each pixel is deviated by a predetermined time. Since exposure for each pixel is constant, an exposure end timing, that is, a reading timing is deviated by the predetermined time in the same manner as the exposure start timing. Therefore, since reading is sequentially performed with a predetermined time difference over the entire section in which invisible light is projected, an expensive element is not necessary, and circuit design also becomes easy.

Data for the entire screen can be obtained while this operation is completed in a section in which invisible light is projected over the forty frames, so that distance information of the whole of projection target 2 is obtained, and the correction content of a content image (video image) is updated. In other words, while visible LED light source 4a is being lighted, DMD 6 projects a content image which is processed on the basis of a distance measurement result until then, onto projection target 2 under the control of calculation device 8. Forty frames are required to complete a single measurement, and thus a content image may be updated forty times during the forty frames, but may be updated at a lower frequency. In a case of the present example, a content image is updated at the same content during the forty frames whenever a single measurement is completed, and a coordinate conversion process based on a distance measurement result previously completed is performed on the content image.

Consequently, even if projection target 2 is moving or is being deformed, a content image can be corrected in real time according to a change in projection target 2, and thus a projected image without being distorted can be provided to a viewer. Particularly, according to the present example, even in a case where projection target 2 moves fast, it is possible to project an appropriate content image onto projection target 2 with high following performance.

Figure 5:
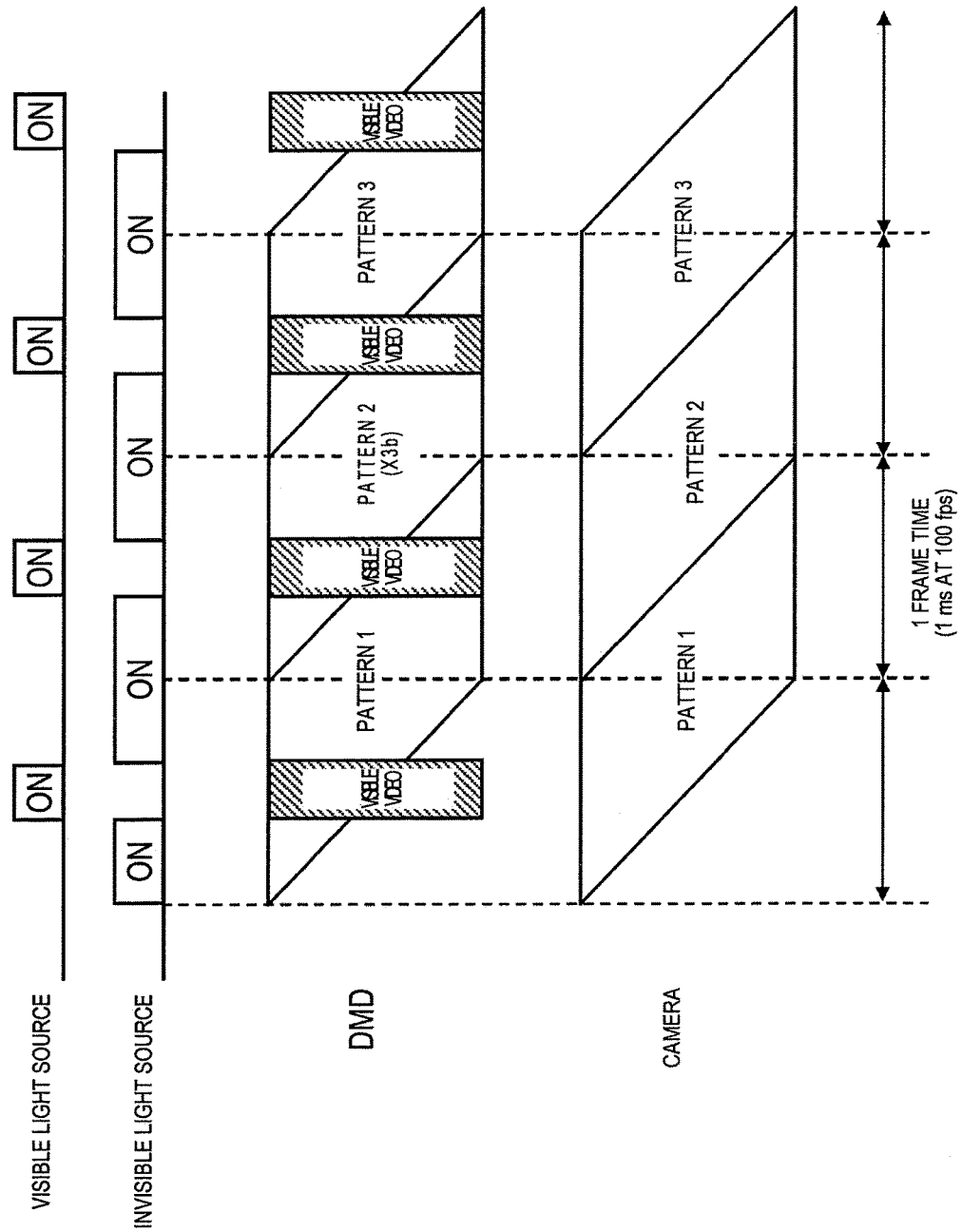
FIG. 5 is the same time chart as in FIG. 4 in a second Example of the present disclosure.

In the Example illustrated in FIG. 4, a content image of one frame is projected whenever projection of each distance measurement pattern is completed. (Actually, a content image of one frame is formed of a set of respective color images of three frames projected for the respective colors of RGB). In contrast, in an Example illustrated in FIG. 5, a content image is interposed between the distance measurement patterns in the middle of projection of the distance measurement patterns. Also in this case, since a content image of one frame is interposed for each distance measurement pattern of one frame, exposure time of each pixel of the distance measurement pattern is constant, and an accurate distance measurement can be performed.

Figure 6:
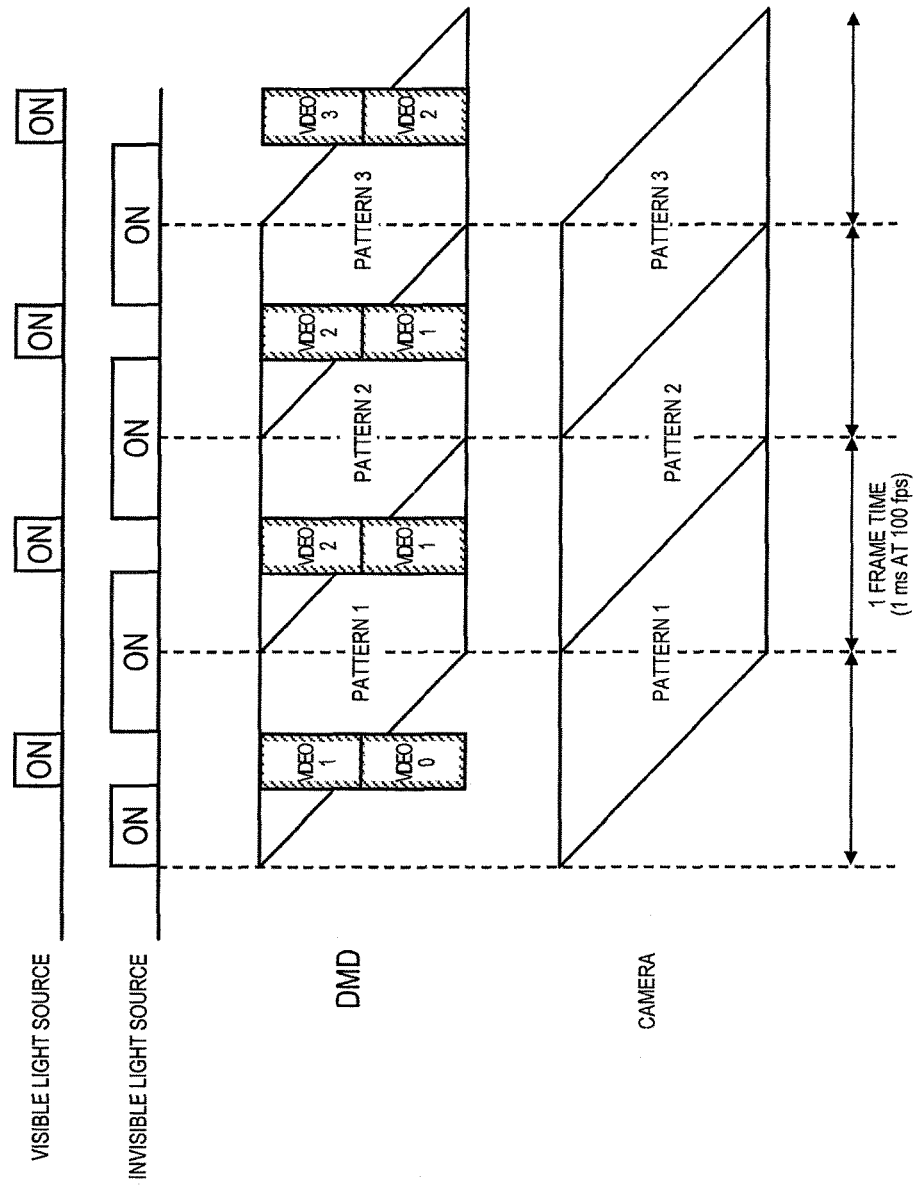
FIG. 6 is the same time chart as in FIG. 4 in a third Example of the present disclosure.

In an Example illustrated in FIG. 6, an update rate of a content image is reduced to a half, and updating is performed in the subfield units which are set to be divided as two parts. Other division methods may be used. In any case, in a case where the same content image is projected during two frames during which images of each pair of complementary measurement patterns are projected, a difference between complementary measurement patterns is taken when code decoding is performed, and thus a content image is canceled out. Therefore, the content image does not interfere with distance measurement, and thus visible light filter 10 is not required to be provided in front of camera 9.

As a further development form of the present disclosure, the content of a projection image may be correlated on the basis of information regarding a distance to a target object. For example, a distance to a target object may be measured as measurement information, and a portion of the target object located within a distance of a specific range may be irradiated to be painted with a specific texture image or a color on the basis of the obtained distance information, or a contour of the target object may be emphasized with a specific color, an emphasis line and/or texture. Consequently, an image adding a special visual effect may be applied to an artist or an athlete standing on the front side on the relatively far background.

Alternatively, color information of a target object may be acquired by using visible light as pattern light, and a specific content image may be projected according to the obtained color information. In other words, a specific color part of a portion of a moving target object may be extracted, and a specific image may be projected onto the portion. For example, a specific portion of the face of a person or clothes of the person may be extracted, and a specific image may be projected onto such a region. A target region may be selectively darkened by painting the region with complementary colors by using a specific image.

Figure 7:
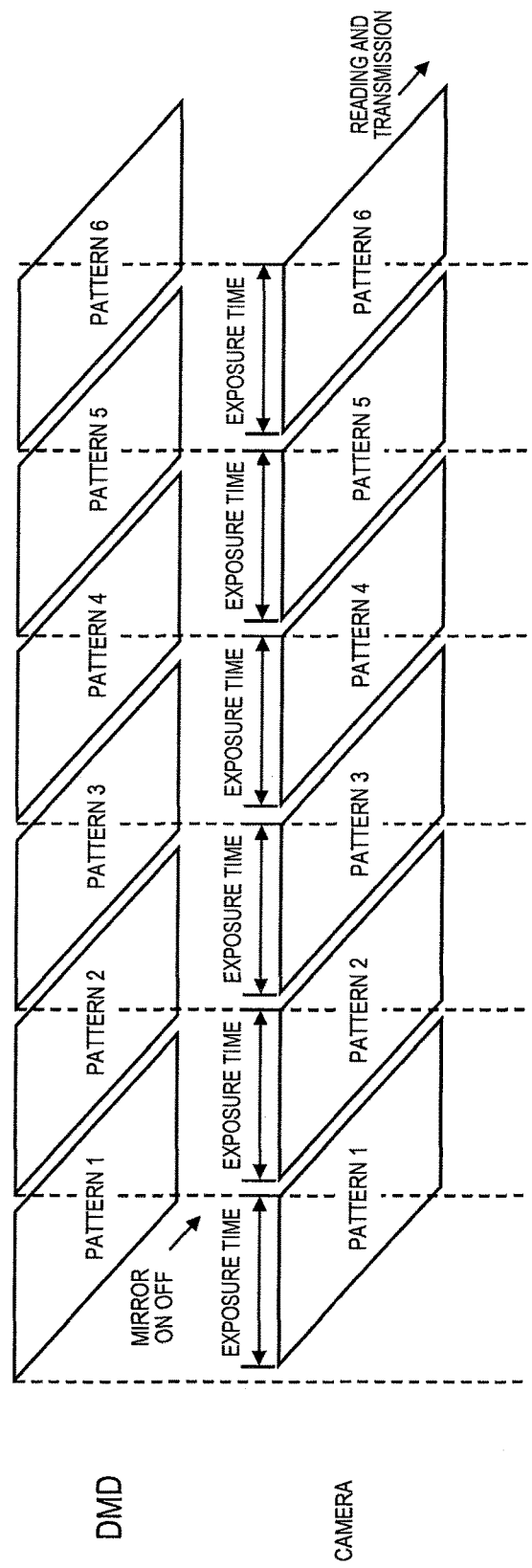
FIG. 7 is a simplified time chart in a fourth Example of the present disclosure in a measurement only device measuring a distance to a target object.

The above Example relates to a configuration of performing distance measurement for performing projection and mapping, but the present disclosure is applicable to a distance measurement only system performing a distance measurement for other purposes. Such a system forms a part of another system. In an Example illustrated in FIG. 7, only distance measurement is performed, only an image of a measurement pattern is projected, raster scanning is performed with an image obtained from projection target 2, so that pixels disposed in a two-dimensional manner are sequentially exposed to light, and then electric charge accumulated in each photosensitive element is extracted (read) after a predetermined exposure time elapses for each photosensitive element such that an electrical signal corresponding to a light reception amount is generated. In this case, an exposure start timing for each pixel is deviated by a predetermined time. Since exposure for each pixel is constant, an exposure end timing, that is, a reading timing is deviated by the predetermined time in the same manner as the exposure start timing. Therefore, since reading is sequentially performed with a predetermined time difference over the entire section in which invisible light is projected, an expensive element is not necessary, and circuit design also becomes easy.

Figure 8:
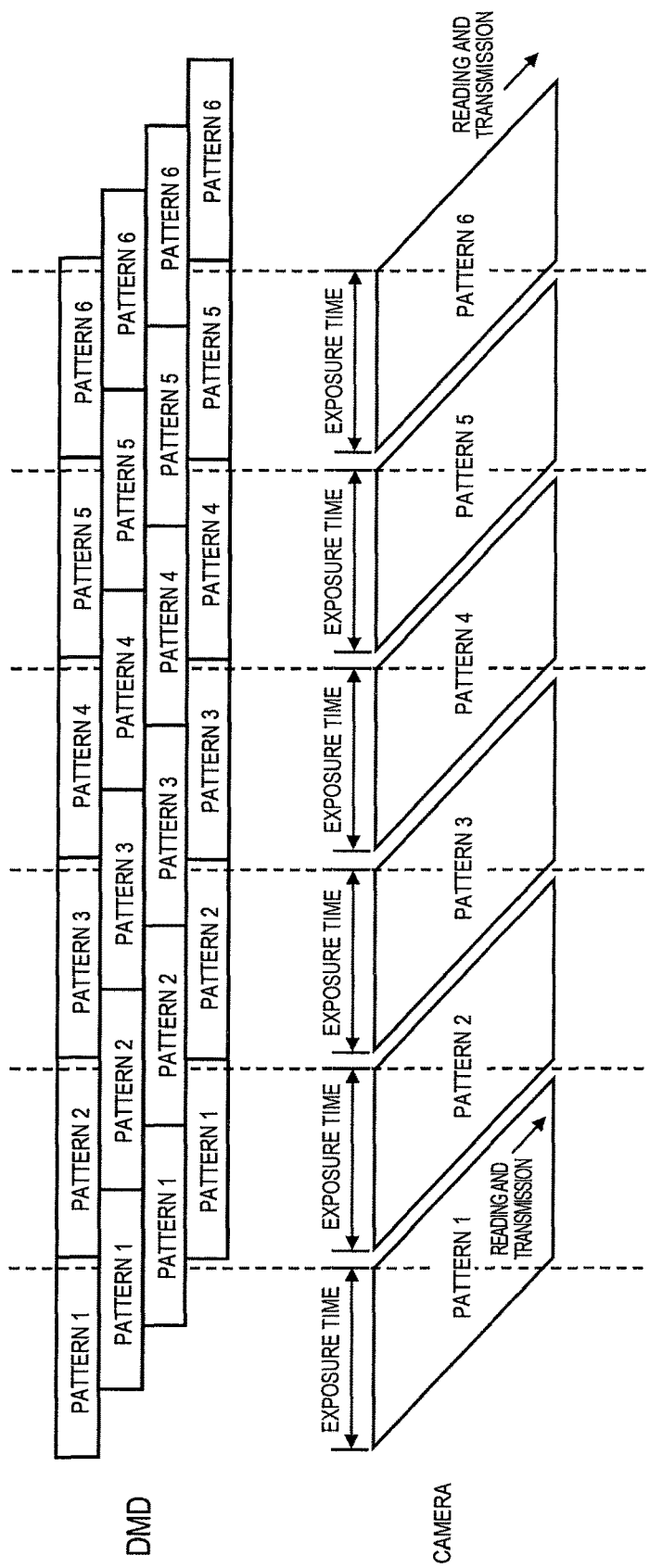
FIG. 8 is a simplified time chart in a fifth Example of the present disclosure in a measurement only device measuring a distance to a target object.

Similarly, in an Example illustrated in FIG. 8, a measurement pattern is divided into four subfields, and the respective subfields are projected with a predetermined time difference. Therefore, in this case, as illustrated in FIG. 8, the measurement pattern may be rewritten stepwise in a scanning direction. Therefore, in a case where a subfield is updated as in the present example, since the update can be performed by transmitting a smaller amount of data per time than in the previous frame update, a high-speed transmission band is not necessary in a projection device, and it is possible to achieve the object with a cheap device.

REFERENCE MARKS IN THE DRAWINGS

1 REAL-TIME-MEASUREMENT PROJECTION DEVICE
2 PROJECTION TARGET
3 PROJECTION DEVICE
4a VISIBLE LED LIGHT SOURCE
4b INFRARED LED LIGHT SOURCE
5 DICHROIC MIRROR

6 DIGITAL MICRO-MIRROR DEVICE (DMD)
7 LENS OPTICAL SYSTEM
8 CALCULATION DEVICE
9 CAMERA
10 VISIBLE LIGHT FILTER
11 PATTERN GENERATOR
12 IMAGE OUTPUT UNIT
13 IMAGE INPUT UNIT
14 PATTERN DECODER
15 FRAME MEMORY
16 DECODING MEMORY
17 COORDINATE CONVERTER
18 COORDINATE CONVERSION MEMORY
19 COORDINATE INTERPOLATOR
20 CONTENT GENERATOR
21 CONTENT MEMORY

The invention claimed is:

1. A real-time-measurement projection device comprising:
   a projection device that projects pattern light including a pattern image onto a projection target;
   an imaging device that electronically acquires a captured image of the projection target irradiated with the pattern light for each pixel for a predetermined exposure time; and
   a calculation device that computes pixel correspondence information between each pixel of the imaging device and each pixel of the projection device by contrasting data of the captured image with data of the pattern image, converts measurement information of each pixel obtained from the imaging device into a correspondence coordinate of the projection device on the basis of the pixel correspondence information, and generates a video to be projected onto the projection target on the basis of the measurement information of each pixel converted into the correspondence coordinate of the projection device,
   wherein the projection device is configured to irradiate the projection target with the video generated by the calculation device as video light in synchronization with a cycle of an exposure time in the imaging device, and
   wherein the imaging device temporally deviates a start point and an end point of the predetermined exposure time for each pixel.

2. The real-time-measurement projection device of claim 1,
   wherein the cycle of the exposure time in the imaging device is set in the frame unit of an image.

3. The real-time-measurement projection device of claim 1,
   wherein the video light is visible light, and the pattern light is invisible light.

4. The real-time-measurement projection device of claim 1,
   wherein each of the pattern light projection device and the video light projection device includes
   a visible light source;
   an invisible light source;
   a dichroic mirror that aligns light beams from both of the light sources on a common optical axis;
   a digital micro-mirror element that spatially modulates light from the mirror; and
   a projection lens that focuses light emitted from the digital micro-mirror element on the projection target.

5. The real-time-measurement projection device of claim 1,
   wherein the imaging device includes a visible light cutoff filter through which the invisible light is transmitted and which blocks the visible light.

6. The real-time-measurement projection device of claim 1,
   wherein the pattern light is temporally shifted to be projected for each of a plurality of subframe regions set in each frame.

7. The real-time-measurement projection device of claim 1,
   wherein the measurement information is distance information obtained according to trigonometry on the basis of the pixel correspondence information, position information of the imaging device, and position information of the projection device.

8. The real-time-measurement projection device of claim 1,
   wherein the pattern light is set on the basis of a space coding method.

9. The real-time-measurement projection device of claim 1,
   wherein the measurement information used for generation of the video is a distance, and a texture image used for generation of a video is changed according to the distance.

10. The real-time-measurement projection device of claim 1,
    wherein the measurement information used for generation of the video is a distance, a clipping mask of a projection target object is generated according to the distance, and a video in which a color of a contour of the mask is changed is generated.

11. The real-time-measurement projection device of claim 1,
    wherein the measurement information used for generation of the video is a distance, and a color of a video is changed according to the distance.

12. The real-time-measurement projection device of claim 1,
    wherein the measurement information is color information imaged by the imaging device.

13. The real-time-measurement projection device of claim 12,
    wherein the measurement information used for generation of the video is color information, and video correction is performed by using a complementary color of a color included in the color information.

14. The real-time-measurement projection device of claim 1,
    wherein the pattern image includes a plurality of pairs of black and white inversion image patterns based on a Manchester coding method, and video content is updated every two frames.

15. The real-time-measurement projection device of claim 14,
    wherein the pattern image is divided into a plurality of subframe regions set in each frame, and the video content of a portion of the pattern image corresponding to each subframe region is updated every two frames.

16. A three-dimensional-projection measurement device comprising:
    a projection device that projects pattern light including a pattern image onto a projection target;
    an imaging device that electronically acquires a captured image of the projection target irradiated with the pattern light for each pixel for a predetermined exposure time; and
    a calculation device that calculates a distance to each point of the projection target by contrasting data of the captured image with data of the pattern image, wherein the imaging device temporally deviates a start point and an end point of the predetermined exposure time for each pixel.

\* \* \* \* \*